United States Patent
Rosen et al.

[11] Patent Number: 6,014,090
[45] Date of Patent: Jan. 11, 2000

[54] METHOD AND APPARATUS FOR DELIVERING LOCAL INFORMATION TO TRAVELERS

[75] Inventors: Kenneth H. Rosen, Middletown; Steven Charles Salimando, Little Silver, both of N.J.

[73] Assignee: AT&T Corp., New York, N.Y.

[21] Appl. No.: 08/995,623

[22] Filed: Dec. 22, 1997

[51] Int. Cl.[7] .................................................. G03G 1/09
[52] U.S. Cl. ........................ 340/905; 340/905; 340/995; 455/56.1; 701/208; 701/211
[58] Field of Search .................................... 340/905, 901, 340/915, 995, 988; 455/33.1, 56.1, 89; 701/208, 211, 207

[56] References Cited

U.S. PATENT DOCUMENTS

| | | | |
|---|---|---|---|
| 4,974,170 | 11/1990 | Bouve et al. | 364/518 |
| 5,103,474 | 4/1992 | Stoodley et al. | 379/58 |
| 5,133,081 | 7/1992 | Mayo | 455/18 |
| 5,185,857 | 2/1993 | Rozmanith et al. | 395/148 |
| 5,237,499 | 8/1993 | Garback | 364/407 |
| 5,555,446 | 9/1996 | Jasinski | 455/54.2 |
| 5,579,535 | 11/1996 | Orlen et al. | 455/33.1 |
| 5,847,663 | 12/1998 | Chasek | 340/905 |
| 5,900,825 | 5/1999 | Pressel et al. | 340/905 |

*Primary Examiner*—Jeffery A. Hofsass
*Assistant Examiner*—Toan Pham

[57] ABSTRACT

Time-dependent, geographically localized information is provided to a mobile communication system. A geographic location identifier associated with a location of the mobile communication system is received. An address of a resource server is associated with the geographic location identifier; the resource server stores time-dependent, geographically localized information. The address of the resource server is sent to the mobile communication system.

40 Claims, 4 Drawing Sheets

METHOD AND APPARATUS FOR DELIVERING LOCAL INFORMATION TO TRAVELERS

FIELD OF THE INVENTION

The present invention relates generally to telecommunications. More specifically, the present invention relates to a method and apparatus for delivering local information to travelers.

BACKGROUND

A traveler seeking information about the local area corresponding to the traveler's location has limited options. For example, highway signs indicate the presence of certain types of facilities, such as gas stations, restaurants, lodgings, hospitals, and automatic teller machines (ATMs). Some highway signs will indicate which specific brands of facilities are located at a particular highway exit.

Similarly, travel books, travel agents and advanced research can provide additional information to the traveler whose situation is sufficiently static and known beforehand so that arrangements can be made. For example, when a traveler knows his or her schedule a day in advance, a travel agent can make reservations at a preferred provider of lodging at a particular location.

These known methods, however, suffer several shortcomings. First, some of these methods do not provide a satisfactory detailed level of information. Highway signs that indicate the presence of lodging at a particular highway exit, do not indicate the size of the hotel, room availability, price, and available services. Information with this added level of detail would be very helpful to a traveler.

Second, some of these methods cannot provide a mobile travel information that is time-dependent. In other words, the provided information is static and cannot be easily updated in a manner that is as dynamic, for example, as the traveler's movements. Highway signs are not updated frequently enough to indicate newly added or removed facilities and cannot provide detailed time-dependent information, such as room availability at a hotel. Travel agents cannot easily modify a traveler's travel plan where those travel plans rapidly change.

SUMMARY OF THE INVENTION

The present invention provides a user of a mobile communication system with geographically localized information that is time-dependent. In other words, upon request, a traveler using the mobile communication system can receive information that is up to date and is relevant to the geographic location of the mobile communication system.

The information provided to the user of the mobile communication system has varying levels of details. The user can control the level of detail of the information to match the user's needs and interests.

Time-dependent, geographically localized information is provided to the mobile communication system. A geographic location identifier associated with a location of the mobile communication system is received. An address of a resource server is associated with the geographic location identifier; the resource server stores time-dependent, geographically localized information. The address of the resource server is sent to the mobile communication system.

The geographic location identifier can be received from a global positioning system (GPS) receiver or a bar code scanner scanning a bar code fixedly located apart from the mobile communication system. The geographic location identifier can be based on mileage marker highway signs observed by the user of the mobile communication system.

The time-dependent, geographically localized information can be received by the mobile communication system over a wireless telecommunications link. The time-dependent, geographically localized information can consist of audio content received on a mobile phone over a wireless telecommunications link. The time-dependent, geographically localized information can include a list of multiple resource servers being related to the geographic location identifier.

The geographic location identifier can be translated into a uniform resource location (URL) associated with a resource server. Alternatively, the geographic location identifier can be translated into a radio frequency to which a radio associated with the mobile communication system can be tuned. Alternatively, the geographic location identifier can be the resource server address itself.

DETAILED DESCRIPTION

Figure 1:
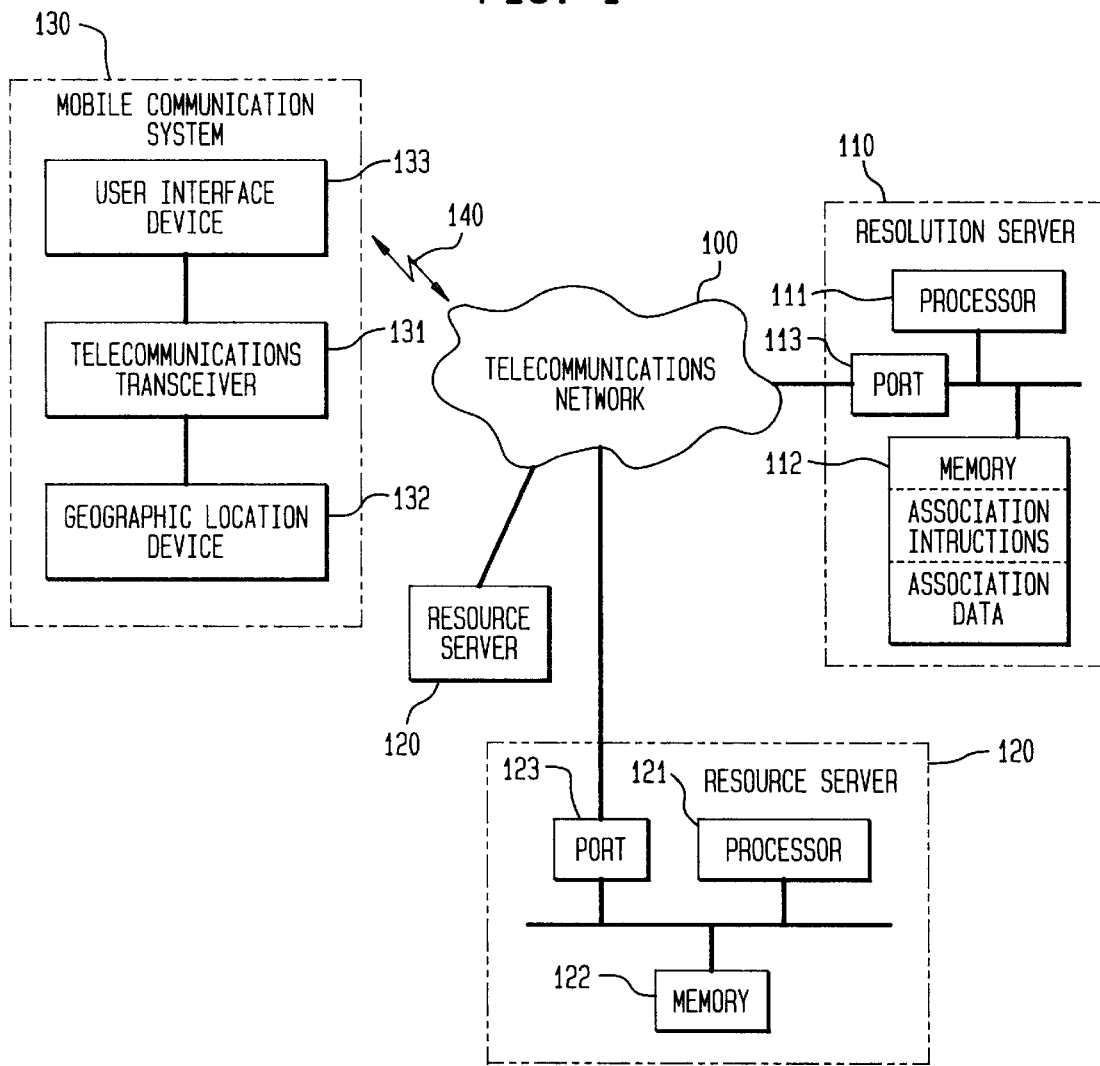
FIG. 1 illustrates system elements associated with a mobile communication system, a resource server, and a resolution server coupled to a telecommunications network, according to an embodiment of the present invention.

FIG. 1 illustrates system elements associated with a mobile communication system, a resource server, and a resolution server coupled to a telecommunications network, according to an embodiment of the present invention. Telecommunications network 100 is connected to resolution server 110, resource servers 120, and mobile communication system 130. Telecommunications network 100 is coupled to mobile communication system 130 over wireless link 140.

Telecommunications network 100 can be any type network including a packet-switched, circuit switched, connectionless, or connection oriented network or interconnected networks, or any combination thereof. For example, telecommunications network 100 can be the public switched telephone network (PSTN). Telecommunications network 100 can include, for example, the AT&T interexchange (IXC) network and/or central offices of local exchange carriers (LECs).

Mobile communication system 130 can be located within any type of vehicle capable of transporting a user. Alternatively, mobile communication system 130 can be carried by a pedestrian. For example, the vehicle associated with mobile communication system 130 can be an automobile, a plane, a train, or a boat. Mobile communication system 130 can include telecommunications transceiver 131, geographic location device 132 and user interface device 133. Telecommunications transceiver 131 is connected to telecommunications network 100 over wireless link 140. Telecommunications transceiver 131 is also connected to geographic location device 132 and to user interface device 133.

Geographic location device 132 can be of any type of device that determines the location of mobile communication system 130. Geographic location device 132 provides a geographic location identifier based on the location of mobile communication system 130 determined by geographic location device 132. For example, geographic location device 132 can be a global positioning system (GPS) receiver which receives signals from the GPS satellite system, thereby specifying the geographic location of mobile communication system 130.

Alternatively, geographic location device 132 can be a bar code scanner configured to be located with mobile communication system 130 and to read bar coding signs fixedly located external from mobile communication system 130. For example, highway signs can include a bar code indicating the geographic location of that particular sign; these roadside bar codes can then be read by the bar code reader of geographic location device 132.

In an alternative embodiment of the present invention, geographic location device 132 is not necessary; the user associated with mobile communication system 130 can provide the necessary geographic location information. For example, the user traveling in an automobile can observe mile markers on the side of the highway to determine his/her particular geographic location. In this case, the geographic location identifier can comprise the specific highway name and the highway mile marker. Similarly, the user traveling in a boat can observe channel markers or buoys to determine his/her geographic location.

User interface device 133 comprises the hardware and/or software necessary to allow the user to interface with telecommunication transceiver 131. For example, user interface device 133 can be an interactive voice response (IVR) or a computer with an input device such as a keyboard or a voice recognizer, and with an output device such as a monitor, a heads-up display (HUD) or audio speaker.

In an alternative embodiment of the present invention, user interface device 133 can be integrated into telecommunication transceiver 131. For example, where telecommunication transceiver 131 is a cellular telephone, user interface device 133 is merely the cellular telephone microphone and speaker; in such an arrangement, of course only audio content can be sent and received including, for example, the audio portion of a WEB page.

Resolution server 110 comprises the hardware and software appropriate to deliver at least one resource server address to mobile communication system 130 based on the geographic location of mobile communication system 130. Resolution server 110 can comprise processor 111, memory 112 having the appropriate association instructions and association data, and port 113. Port 113 is coupled to processor 111 and memory 112. Resolution server 110 can be coupled to telecommunications network 110 through port 113. In alternative embodiment, processor 111 and memory 112 of resolution server 110 are coupled to user interface device 133 located with mobile communication system 130 rather than being coupled through telecommunication network 100. In other embodiment, processor 111 and memory 112 of resolution server 110 are located at resource server 120 and coupled to a port 123 of resource server 120.

Resource servers 120 comprise the hardware and software appropriate to store and provide information. Resource server 120 can comprise processor 121, memory 122 and port 123. Port 123 can be coupled to processor 121 and memory 122. Resource server 120 can be coupled to communications network 100 through port 121. Resource server 120 can store resources such as WEB pages that contain information that would be of interest to travelers.

For example, a resource can be a WEB page associated with a particular facility or service and can contain information in the form of text, audio, video, animation and/or multimedia. Alternatively, a resource can be audio content associated with a particular facility or service so that the resource can be provided to the user associated with mobile communication system 130 via an audio speaker associated with a radio or a telephone. The associated facility or service can be, for example, a hotel, restaurant, gas station, and so on. The address of a resource server can be, for example, a universal resource locator (URL) associated with WEB page or can be a phone number associated with a file having only audio content.

Figure 4:
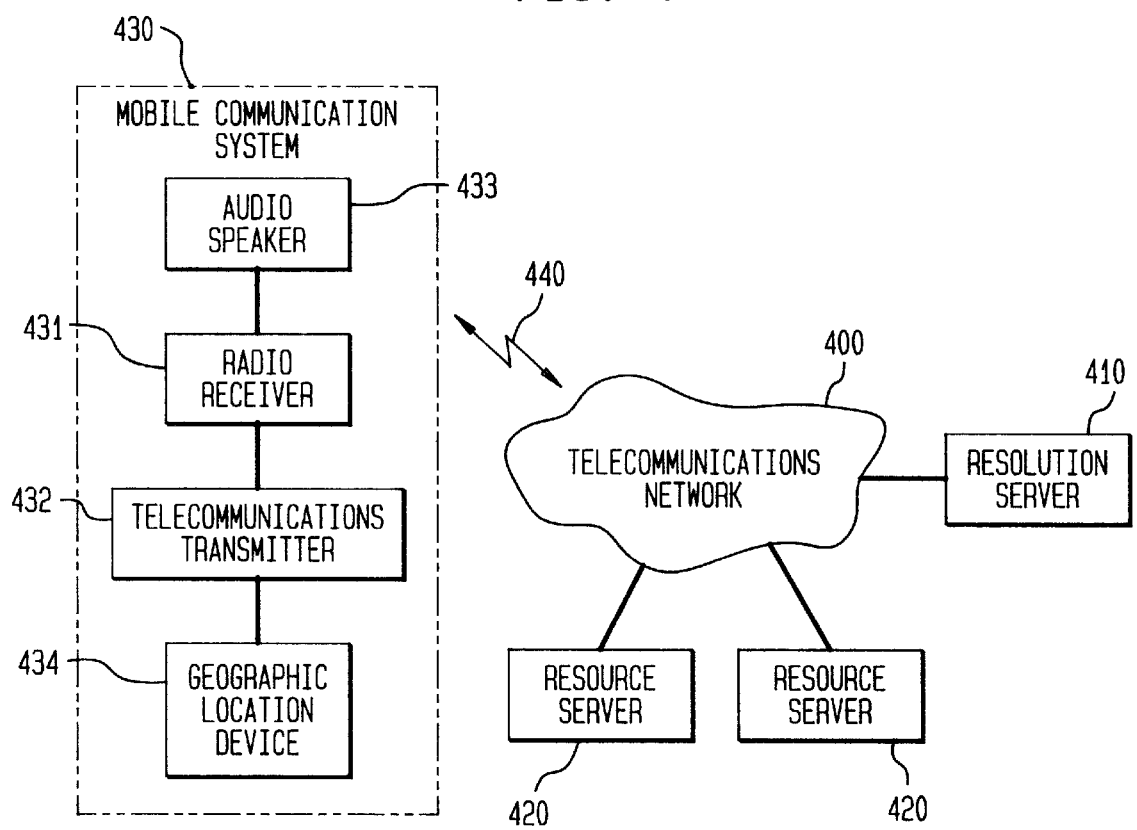
FIG. 4 illustrates system elements associated with a mobile communication system, a resource server, and a resolution server coupled to a telecommunications network, according to another embodiment of the present invention.

FIG. 4 illustrates system elements associated with a mobile communication system, a resource server, and a resolution server coupled to a telecommunications network, according to another embodiment of the present invention. Telecommunications network 400 is coupled to mobile communication system 430 over wireless link 440.

Mobile communication system 430 includes telecommunications transmitter 431, geographic location device 432, user interface device 433 and radio receiver 431. Telecommunications transmitter 431 is coupled to telecommunications network 400 over wireless link 440. Telecommunications transceiver 431 is also coupled to geographic location device 432 and to radio receiver 431.

Resource server 420 can store resources such as audio content that would be of interest to travelers. For example, a resource can be audio content associated with a particular facility or service. The resource server address can be in the form of, for example, a radio frequency. Radio receiver 431 of mobile communication system 430 can be tuned manually (or even automatically) to that radio frequency carrying the information. Upon tuning radio receiver 431 to that radio frequency associated with the appropriate resource server 420, the audio content of the resource can be played to the user associated with mobile communication system 430 through audio speaker 433.

Figure 2:
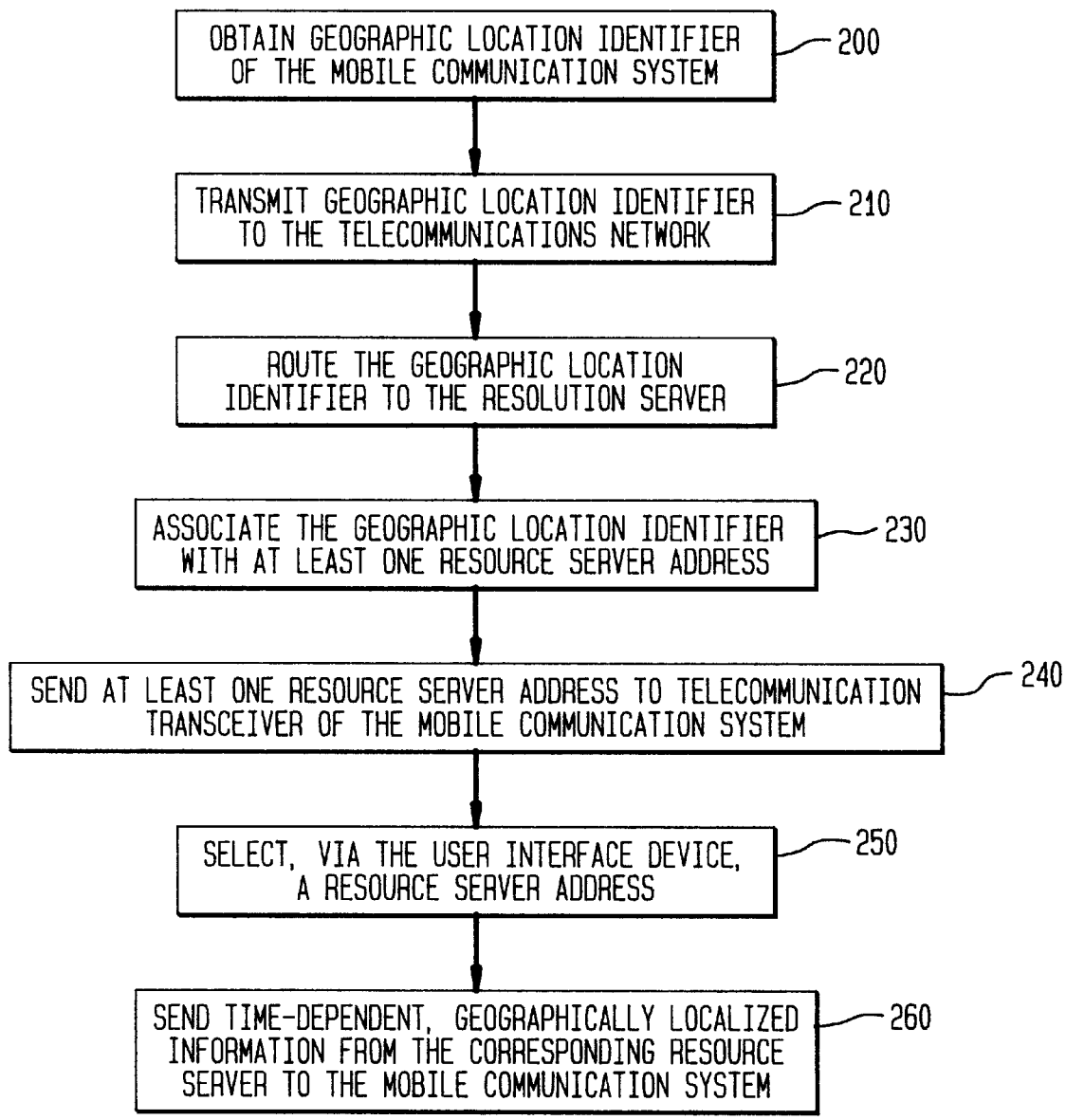
FIG. 2 provides a flowchart illustrating a process for delivering local information to users, according to an embodiment of the present invention.

FIG. 2 provides a flowchart illustrating a process for delivering local information to users, according to an embodiment of the present invention. At step 200, a geographic location identifier associated with mobile communication system 130 is obtained. This can be performed as described above with reference to geographic location device 132. For example, where geographic location device 132 is a GPS receiver, the geographic location of mobile communication system 130 can be obtained in terms of latitude and longitude coordinates. This GPS-based format of the geographic location identifier associated with mobile communication system 130 can then be provided to telecommunications transceiver 131. Alternatively, the geographic location identifier can be a specific highway name and highway mile marker.

At step 210, the geographic location identifier is transmitted over wireless link 140 to telecommunications network 100. In alternative embodiment, additional information other than the geographic location identifier can be transmitted with the geographic location identifier. For example, a request for a specific type of information (e.g. a request for a particular facility of service) can be transmitted with the geographic location identifier. Alternatively, a user identifier can be transmitted with the geographic location identifier in the case where the user has predefined a profile of preferred facilities and services. Such a user profile can be stored at memory 122 of resource server 120. In step 220, the geographic location identifier can be routed to resolution server 110 from telecommunications network 100.

In one embodiment of the present invention discussed above where resolution server 110 is coupled to telecommunication transceiver 131 of mobile communication system 130, steps 210 and 220 would not be necessary. Instead, the geographic location identifier can be directly routed to resolution server 110 through telecommunication transceiver 131.

At step 230, resolution server 110 associates the geographic location identifier with the address of at least one resource server corresponding to that specified geographic location. Resolution server 110 maps the received geographic location identifier into the at least one corresponding resource server address. In other words, several geographic location identifiers can correspond to a particular resource server address associated with a geographic area; resolution server 110 can associate the resource server address for that particular geographic area based on the received geographic location identifier. For example, where the geographic location identifier is based GPS coordinates, resolution server 110 maps the received geographic location identifier from a range of possible GPS coordinates into a resource server address.

Step 230 can be performed in a variety of ways. For example, based on the association instruction contained within memory 112 of resolution server 110, the geographic location identifier can act as a key word in a query of the association data contained within memory 112. The association data can correspond to various resource servers 120 connected to telecommunications network 100.

The results of the query, for example, can include a single resource server 120 containing centralized information, such as a community WEB page where various pieces of local information have been integrated into a single resource. Alternatively, the results of the query can include several resource servers 120 each one of which provides information of potential interest to mobile communication system 130.

In one embodiment of the present invention where geographic location device 132 is a GPS receiver, resolution server 110 translates the GPS provided location into a universal resource locator (URL) for the World Wide Web address. In another embodiment where geographic location device 132 is not present and where the geographic location identifier includes the highway name and the highway mile marker, resolution server 110 can construct a URL. For example, if the geographic location identifier comprises "Garden State Parkway Exit 114," the associated resource server address could be "www. gsp.gov/114.html." In this embodiment where the geographic location identifier is based on highway mileage markers, resolution server 110 maps the received geographic location identifier from a range of highway mileage into a resource server address.

A profile, unique for the user of mobile communication system 130, can be predefined. For example, the user can predefine preferred facilities and services such as preferred hotels, gas stations, restaurants, etc. Similarly, the user can predefine specific services associated with a given facility such as services for a hotel room: smoking versus nonsmoking, king-size bed versus two double beds, facsimile/ computer capabilities in the room, and so on. In this embodiment, the user's profile can be stored in memory 112 of resolution server 110. The WEB addresses of the multiple facilities and services that correspond to the user's profile can be included in the association data stored in memory 112 of resolution server 110.

At step 240, the associated resource server address(es) is sent to telecommunication transceiver 131 of mobile communication system 130 through telecommunication network 100. The associated resource server address(es) can be presented to the user associated with mobile communication system 130 via user interface device 133 of mobile communication system 130.

At step 250, the user of mobile communication system 130 can select a particular resource server address from the associated resource server address(es). Each selected resource server address can be a hyperlink associated with a corresponding resource server 120. When the user selects a specific resource server address, mobile communication system 130 can be connected to the corresponding resource server 120 in at least two different ways. First, mobile communication system 130 can be connected to the appropriate resource server 120 through resolution server 110 which acts as a proxy server. Second, mobile communication system 130 can be connected to the appropriate resource server 120 through telecommunication network 100 without a proxy server.

At step 260, time-dependent, geographically localized information is sent from the appropriate resource server 120 to telecommunication transceiver 131 of mobile communication system 130. The information associated with the appropriate resource server 120 can be provided to the user from telecommunication transceiver 131 via user interface device 133.

Once the time-dependent, geographically localized information has been provided to the user, the user can make further selections to obtain more specific information (e.g., to check on room availability at a local hotel) and/or to send communications to the associated facilities or service (e.g., to make a room reservation at the local hotel). Note that the localized information provided to the user is time-dependent in the sense that it can be dynamically updated to reflect current activities and status. For example, localized information provided by a hotel can be updated to include current room availability.

Note also that the geographically localized information can be provided by multiple resource servers each being associated with a particular facility or service. Alternatively, the geographically localized information can be provided by a single resource server which aggregates the localized information into a single source. For example, a local chamber of commerce can aggregate localized information for multiple facilities or services into a single resource server.

Figure 3:
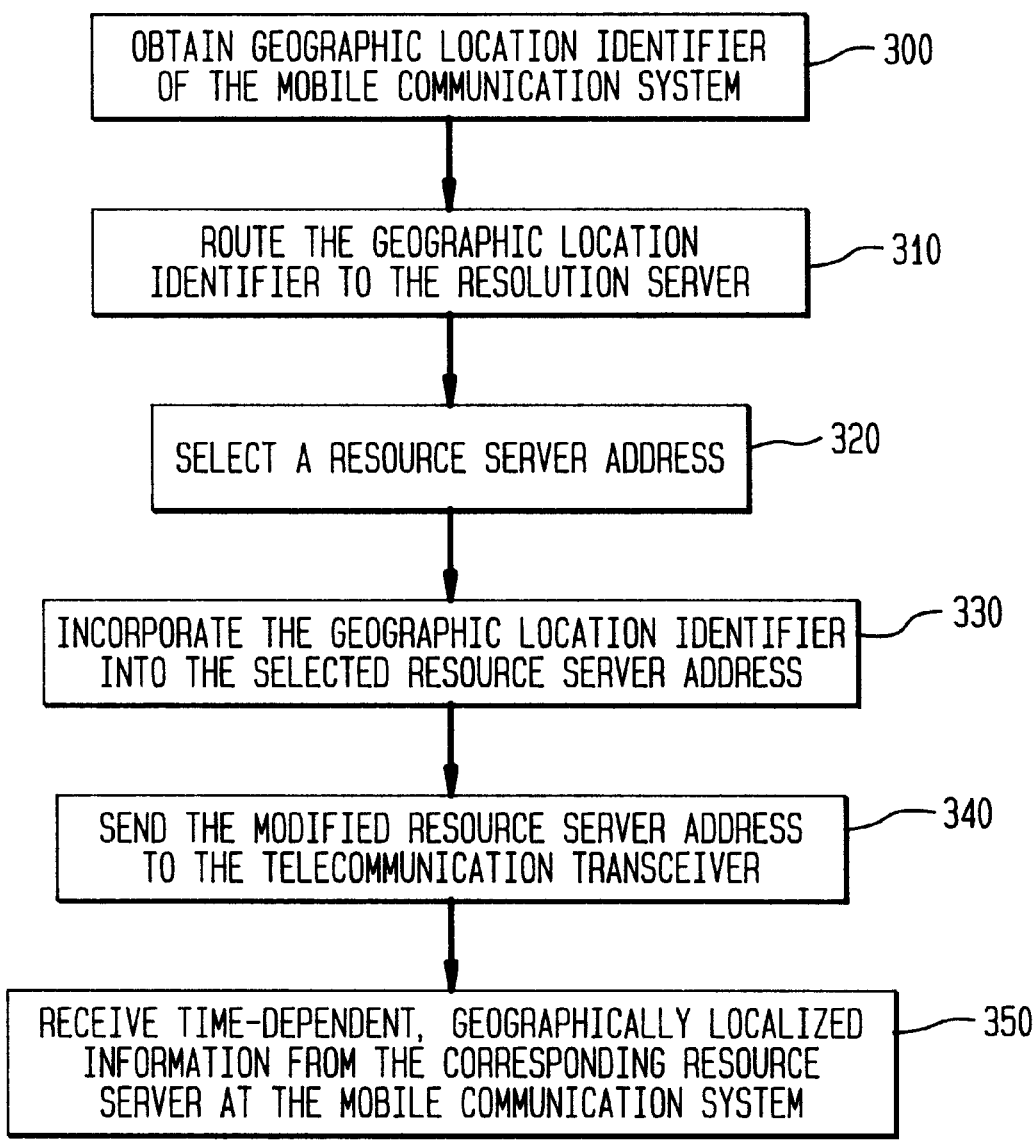
FIG. 3 provides a flowchart illustrating a process for delivering local information to users, according to another embodiment of the present invention.

FIG. 3 provides a flowchart illustrating a process for delivering local information to users, according to another embodiment of the present invention. In step 300, a geographic location identifier associated with mobile communication system 130 is obtained. At step 310, the geographic location identifier is routed to the resolution server. The resolution server in this embodiment can be located with mobile communication system 130 and connected to telecommunications transceiver 131.

At step 320, the user can select a resource server address. For example, a set of predetermined resource server addresses can be stored on memory 112 of resolution server 110. Through user interface device 133, the various resource server addresses stored on memory 112 can be displayed to the user. The user then can select one address from this list of resource server addresses. For example, a user can select the resource server address for a particular hotel chain, rather than predetermined resource server addresses for gas stations, restaurants, etc.

At step 330, resolution server 110 incorporates the geographic location identifier provided by geographic location device 132 into the selected resource server address. For example, where the geographic location device 132 is a GPS receiver, resolution server 110 can modify the selected resource server address to include the latitude and longitude coordinates provided by the GPS receiver of geographic location device 132 onto the end of the resource server address. The appended latitude and longitude coordinates would consequently appear as a file extension associated with the resource server address.

At step 340, the modified resource server address is sent to telecommunication transceiver 131. Resource server 120 can be configured to receive and process the additional geographic location identifiers built into the resource server address. In such a manner, resolution server 110 can map the received geographic location identifier into the at least one corresponding resource server address. In other words, several geographic location identifiers can correspond to a particular resource server address associated with a geographic area; resolution server 110 can associate the resource server address for the particular geographic area based on the received geographic location identifier.

For example, resource server 120 can be configured to receive the incorporated geographic location identifier, such as a latitude and longitude coordinate, so that a specific file having associated latitude and longitude ranges is selected. In such a configuration, resource server 120 would likely have several geographic-location-based resource files and its own set of association instructions and association data. The resource server based association instructions and association data would associate a geographic location identifier imbedded in the received resource source address with the appropriate geographic-specific resource file.

At step 350, time-dependent, geographically localized information from the resource server 120 corresponding to the modified resource server address and the geographic-specific resource file is received by telecommunications transceiver 131 of mobile communication system 130. The information associated with the appropriate resource server 120 can be provided to the user from telecommunication transceiver 131 via user interface device 133.

It should, of course, be understood that while the present invention has been described in reference to particular system configurations and processes, other system configurations and processes should be apparent to those of ordinary skill in the art. For example, the present invention can include any number of resolution servers and resource servers, and be connected to a telecommunication network or combination of telecommunication networks.

What is claimed is:

1. A method for providing time-dependent, geographically localized information to a mobile communication system, comprising:

(a) receiving at a resolution server a geographic location identifier associated with a location of the mobile communication system;

(b) associating, at the resolution server, an address of at least one resource server with the geographic location identifier, the resource server storing time-dependent, geographically localized information; and (c) sending the address of the resource server to the mobile communication system.

2. The method of claim 1, further comprising:

(d) sending, to the mobile communication system, the time-dependent, geographically localized information from the resource server based on the address.

3. The method of claim 2, wherein the time-dependent, geographically localized information is received, in said receiving step (d), by the mobile communication system over a wireless telecommunications link.

4. The method of claim 2, wherein:

the mobile communication system includes a mobile phone; and the time-dependent, geographically localized information consists of audio content received, in said receiving step (d), on the mobile phone over a wireless telecommunications link.

5. The method of claim 2, wherein:

the mobile communication system includes a radio; and the time-dependent geographically localized information consists of audio content received, in said receiving step (d), on the radio of the mobile communication system.

6. The method of claim 2, wherein:

the mobile communication system includes a radio;

the address of the resource server associated in said associating step (b) is a radio frequency; and the time-dependent geographically localized information consists of audio content received, in said receiving step (d), on the radio of the communication system which is tuned based on the radio frequency associated in step associating step (b).

7. The method of claim 1, wherein:

the mobile communication system includes a global positioning system (GPS); and the geographic location identifier associated with the mobile communication system is received in said receiving step (a) from the GPS receiver.

8. The method of claim 1, wherein:

the mobile communication system includes a bar code scanner; and the geographic location identifier associated with the mobile communication system is received in said receiving step (a) from the bar code scanner scanning a bar code fixedly located apart from the mobile communication system.

9. The method of claim 1, wherein the geographic location identifier associated with the mobile communication system is received in said receiving step (a) from a user of the mobile communication system viewing a mileage marker highway sign.

10. The method of claim 1, wherein the time-dependent, geographically localized information includes a plurality of resource servers related to the geographic location identifier.

11. The method of claim 1, wherein the address of the resource server is associated with the geographic location identifier in said associating step (b) based on a predefined profile.

12. The method of claim 1, wherein the address of the resource server associated in said associating step (b) is a uniform resource location (URL) associated with the resource server.

13. The method of claim 1, wherein the resolution server is located with a user's mobile communication device.

14. The method of claim 1, wherein the at least one resource server includes a plurality of resource servers.

15. A method for providing time-dependent, geographically localized information to a mobile communication system, comprising:
- (a) determining, at the mobile communication system, a geographic location identifier associated with the mobile communication system;
- (b) sending the geographic location identifier from the mobile communication system to a resolution server;
- (c) receiving, at the mobile communication system, a resource server address from the resolution server based on the geographic location identifier;
- (d) sending the resource server address from the mobile communication system to a resource server; and
- (e) receiving, at the mobile communication system, the time-dependent, geographically localized information from the resource server based on the resource server address.

16. The method of claim 15, wherein:
the mobile communication system includes a global positioning system (GPS); and
the geographic location identifier associated with the mobile communication system is determined in said determining step (a) using the GPS receiver.

17. The method of claim 15, wherein:
the mobile communication system includes a bar code scanner; and
the geographic location identifier associated with the mobile communication system is determined in said determining step (a) using the bar code scanner scanning a bar code fixedly located apart from the mobile communication system.

18. The method of claim 15, wherein the geographic location identifier associated with the mobile communication system is determined in said determining step (a) by a user of the mobile communication system viewing a mileage marker highway sign.

19. The method of claim 15, wherein:
the mobile communication system includes a mobile phone; and
the time-dependent, geographically localized information consists of audio content received, in said receiving step (e), on the mobile phone over a wireless telecommunications link.

20. The method of claim 15, wherein:
the mobile communication system includes a radio; and
the time-dependent geographically localized information consists of audio content received, in said receiving step (e), on the radio of the communication system.

21. The method of claim 15, wherein the time-dependent, geographically localized information includes a plurality of resource servers related to the geographic location identifier.

22. The method of claim 15, wherein the address of the resource server is associated with the geographic location identifier in said associating step (b) based on a predefined profile.

23. The method of claim 15, wherein the address of the resource server associated in said associating step (b) is a uniform resource location (URL) associated with the resource server.

24. The method of claim 15, wherein:
the mobile communication system includes a radio;
the address of the resource server received in said receiving step (c) is a radio frequency; and
the time-dependent geographically localized information consists of audio content received, in said receiving step (e), on the radio which is tuned based on the radio frequency received in step receiving step (c).

25. A method for providing time-dependent, geographically localized information to a mobile communication system, comprising:
- (a) determining a geographic location identifier associated with the mobile communication system, the geographic location identifier including a resource server address;
- (b) sending the resource server address to a resource server; and
- (c) receiving the time-dependent, geographically localized information from the resource server corresponding to the resource server address.

26. A method for providing time-dependent, geographically localized information to a mobile communication system, comprising:
- (a) determining a geographic location identifier associated with the mobile communication system;
- (b) sending the geographic location identifier from the mobile communication system to a resolution server;
- (c) selecting a resource server address;
- (d) modifying the selected resource server address based on the geographic location identifier; and
- (e) receiving the time-dependent, geographically localized information based on the modified resource server address.

27. An apparatus for providing time-dependent, geographically localized information to a mobile communication system, comprising:
a processor;
a memory storing a plurality of resource server addresses, said memory storing association instructions adapted to be executed by said processor to associate a resource server address from the plurality of resource server addresses based on a geographic location identifier associated with a location of the mobile communication system; and
a port to be coupled to a communication network and through which the geographic location identifier is received and through which time-dependent, geographically localized information is sent, said memory and said port being coupled to said processor.

28. The apparatus of claim 27, wherein:
the mobile communication system includes a telecommunication receiver being coupled to the network through a wireless telecommunications link,
said apparatus is located with the mobile communication system and coupled to the telecommunication transceiver through said port.

29. A mobile apparatus, coupled to a telecommunication network, for providing a plurality of time-dependent, geographically localized information, comprising:
a geographic location device, said geographic location device determining a geographic location identifier associated with a location of said mobile apparatus; and
a telecommunication transceiver coupled to said geographic location device, said telecommunication transceiver sending the geographic location identifier to a telecommunication network, said telecommunications transceiver receiving time-dependent, geographically localized information based on the geographic location identifier.

30. The apparatus of claim 29, wherein said geographic location device is a global positioning system (GPS) receiver.

31. The apparatus of claim 29, wherein said geographic location device is a bar code scanner capable of scanning a bar code fixedly located outside said mobile apparatus.

32. The apparatus of claim 29, wherein a user located with said mobile apparatus observes a mileage marker highway sign to determine the geographic location identifier.

33. The apparatus of claim 29, wherein said telecommunication transceiver sends the geographic location identifier and receives the time-dependent, geographic location information over a wireless telecommunications link.

34. The apparatus of claim 29, wherein:

said telecommunication transceiver includes a mobile phone coupled to the telecommunication network by a wireless telecommunications link; and the time-dependent, geographically localized information consists of audio content received on the mobile phone.

35. The apparatus of claim 29, wherein:

said telecommunication transceiver includes a radio; and the time-dependent geographically localized information consists of audio content received on a radio.

36. The apparatus of claim 29, further comprising a user interface device coupled to said telecommunication transceiver, the mobile communication system receiving the time-dependent, geographic localized information through said user interface device.

37. The apparatus of claim 29, wherein:

the telecommunication transceiver receives and sends a resource server address based on the geographic location identifier; and the resource server address is a uniform resource location (URL) associated with the resource server.

38. The apparatus of claim 29, wherein:

the telecommunication transceiver includes a radio, the telecommunication transceiver receives and sends a resource server address based on the geographic location identifier; and the resource server address is a radio frequency associated with the resource server; and the time-dependent geographically localized information consists of audio content received on the radio of the telecommunication transceiver which is tuned based on the radio frequency.

39. The apparatus of claim 29, wherein said user interface device is a mobile telephone and wherein the time-dependent, geographic location information received by said telecommunication transceiver consists of audio content.

40. An apparatus for providing time-dependent, geographically localized information to a mobile communication system, comprising:

means for receiving a geographic location identifier associated with the mobile communication system;

means for associating an address of a resource server based on the geographic location identifier, the resource server storing time-dependent, geographically localized information; and means for sending the address of the resource server to the mobile communication system.

\* \* \* \* \*